United States Patent
Moje et al.

(10) Patent No.: US 9,650,143 B2
(45) Date of Patent: May 16, 2017

(54) LUGGAGE SYSTEM HAVING A COMPONENT INSTALLATION SPACE

(71) Applicant: Airbus Operations GmbH, Hamburg (DE)

(72) Inventors: Sabrina Moje, Hamburg (DE); Matthias Breuer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 153 days.

(21) Appl. No.: 14/566,263

(22) Filed: Dec. 10, 2014

(65) Prior Publication Data
US 2015/0158588 A1 Jun. 11, 2015

(30) Foreign Application Priority Data
Dec. 11, 2013 (DE) .......... 10 2013 021 109

(51) Int. Cl.
*B64D 11/00* (2006.01)
*B64D 13/00* (2006.01)

(52) U.S. Cl.
CPC ............ *B64D 11/003* (2013.01); *B64D 11/00* (2013.01)

(58) Field of Classification Search
CPC .......... B64D 11/00; B64D 11/03; B64D 13/00
See application file for complete search history.

(56) References Cited

U.S. PATENT DOCUMENTS

| | | | |
|---|---|---|---|
| 3,370,813 A * | 2/1968 | Albertine | B64D 11/00 244/118.5 |
| 3,386,765 A | 6/1968 | Drach | |
| 4,951,560 A | 8/1990 | Setan | |
| 5,651,733 A * | 7/1997 | Schumacher | B64D 11/00 362/471 |
| 5,820,076 A * | 10/1998 | Schumacher | B64D 11/003 244/118.5 |
| 6,318,671 B1 * | 11/2001 | Schumacher | B64D 11/003 244/118.5 |
| 7,234,666 B2 * | 6/2007 | Novak | B64D 11/003 244/118.5 |
| 2002/0020652 A1 | 2/2002 | Martinez | |
| 2009/0194635 A1 | 8/2009 | Ehlers et al. | |
| 2010/0044509 A1 | 2/2010 | Helfrich et al. | |
| 2010/0206985 A1 | 8/2010 | Rahlff | |

FOREIGN PATENT DOCUMENTS

| | | |
|---|---|---|
| DE | 195 40 929 A1 | 5/1997 |
| DE | 10 2007/030331 A1 | 1/2009 |
| DE | 10 2008/006949 A1 | 8/2009 |
| DE | 10 2008/039637 A1 | 3/2010 |
| EP | 0919431 A1 | 6/1999 |
| EP | 0771728 B1 | 9/2002 |

* cited by examiner

*Primary Examiner* — Philip J Bonzell
(74) *Attorney, Agent, or Firm* — Jenkins, Wilson, Taylor & Hunt, P.A.

(57) ABSTRACT

A luggage system includes a luggage compartment having a base body and a flap which is movable between a closed position and an open position and is configured to make accessible or close an interior space of the base body. The flap includes a first flap element facing the interior space of the base body and a second flap element facing away from the interior space of the base body, wherein an installation space for components which are to be installed in the region of the luggage compartment is provided between the first and the second flap element.

20 Claims, 6 Drawing Sheets

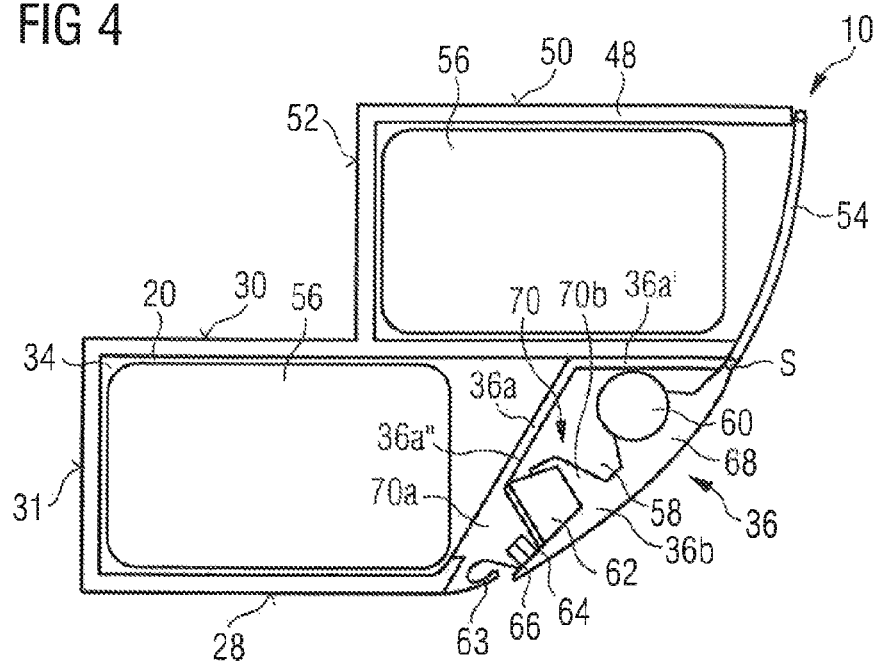
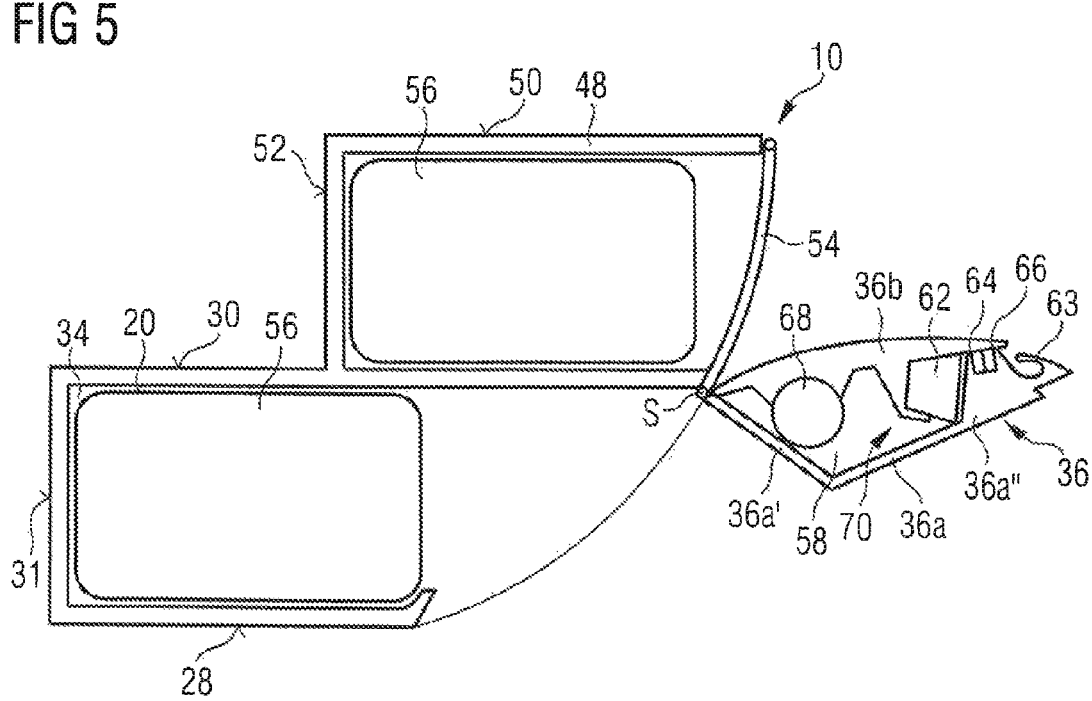

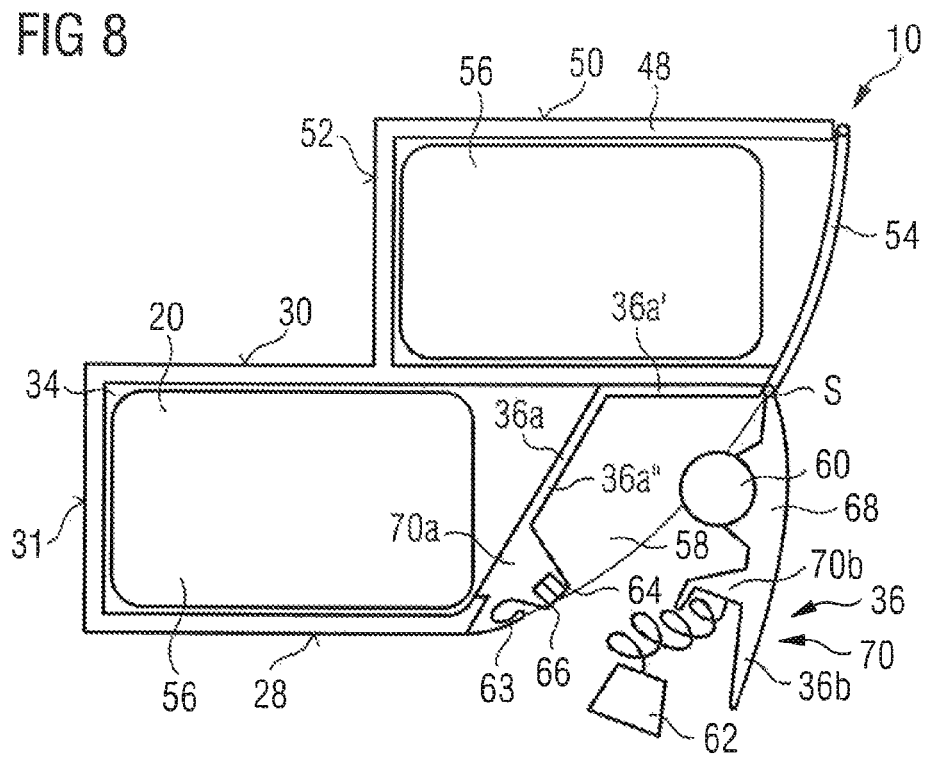

LUGGAGE SYSTEM HAVING A COMPONENT INSTALLATION SPACE

CROSS-REFERENCE TO RELATED APPLICATION

This application claims priority to DE 10 2013 021 109.3 filed Dec. 11, 2013, the entire disclosure of which is incorporated by reference herein.

TECHNICAL FIELD

The disclosure herein relates to a luggage system provided for installation in an aircraft and an aircraft region equipped with a luggage system of this type.

BACKGROUND

In a passenger cabin of a modern commercial aircraft, a plurality of overhead luggage compartments are provided which are installed along a longitudinal axis of the passenger cabin above passenger seating rows. The luggage compartments are usually mounted such that, in the region of an underside, facing the passenger-cabin floor, of the luggage compartments extending above seating rows mounted in the passenger cabin, there is sufficient space for mounting components which are to be integrated in this region, for example PSU components and the components of an emergency oxygen system. However, the stowage space available in the overhead luggage compartments is limited and often insufficient to accommodate every item of hand luggage brought into the passenger cabin by passengers. EP 0 771 728 B1 or U.S. Pat. No. 5,820,076 therefore proposes fitting a passenger cabin of a commercial aircraft with luggage compartments which can each be lowered from a closed transport position into an open loading position by way of guide systems. Each luggage compartment is formed by at least two stowage compartments which, in a closed transport position of the luggage compartments, are arranged adjacent to one another in a ceiling area of the passenger cabin in the transverse direction of the cabin, wherein base plates of the stowage compartments form at least part of a ceiling contour of the passenger cabin. In the lowered loading position, the stowage compartments can be positioned on top of one another above seating rows with an access area directed towards an aisle.

SUMMARY

An object of the disclosure herein is to provide a luggage system which is intended for installation in an aircraft and offers sufficient stowage space whilst at the same time enabling components which are to be integrated in the region of the luggage system to be mounted in a manner which saves on installation space. A further object of the disclosure herein is to provide an aircraft region equipped with a luggage system of this type.

These objects are achieved, at least in part, by a luggage system having the features disclosed herein and an aircraft region having the features disclosed herein.

A luggage system which is particularly suitable for mounting in an aircraft cabin comprises a luggage compartment having a base body and a flap which is movable between a closed position and an open position and which is configured to make accessible or close an interior space of the base body. The luggage compartment base body preferably comprises an upper side which, when the luggage system is mounted in an aircraft region, faces a ceiling area of the aircraft region. The luggage compartment base body may furthermore comprise an underside which is particularly arranged opposite the upper side and, when the luggage system is mounted in an aircraft region, faces a floor area of the aircraft region. The luggage compartment base body furthermore preferably has a rear side which, when the luggage system is mounted in an aircraft region, faces an outer contour of the aircraft region. The term "outer contour of the aircraft region" refers here to an outer delimitation of the aircraft region, i.e. a delimitation facing away from an interior space of the aircraft region, which may be defined for example by an aircraft outer skin which may be connected in force-transmitting manner to a primary structure of the aircraft. Finally, the luggage base body may comprise two side faces connecting the upper side and the underside to one another.

The luggage compartment preferably is a luggage compartment having a base body whereof the underside is rigidly connected to the side walls and the rear wall. A luggage compartment of this type is also known as a "fixed bin" and can be manufactured and mounted in relatively simple manner. Moreover, a luggage compartment constructed as a "fixed bin" only has a small number of moving parts, namely only the flap, which is pivotable between a closed position and an open position, and therefore requires relatively little maintenance.

However, if desired, the luggage compartment may also be a luggage compartment which has a lower shell which is pivotable relative to the side walls of the luggage compartment base body between an open position and a closed position. In the case of such a luggage compartment, which is also known as a "movable bin", the pivotable lower shell may be lowered relative to the side walls of the luggage compartment base body in the direction of the floor of the aircraft region, so that luggage items can be placed in, and removed from, the shell. A luggage compartment with a movable lower shell can be adapted particularly well to the outer contour of the aircraft region, however its number of moving parts means that it is relatively maintenance intensive and costs more to manufacture and mount than a luggage compartment constructed as a "fixed bin".

The flap which is movable between a closed position and an open position comprises a first flap element which faces the interior space of the base body as well as a second flap element which faces away from the interior space of the base body. An installation space for components to be installed in the region of the luggage system is provided between the first and the second flap element. These components may include for example electrical or electronic components, components of an aircraft air-conditioning system, such as air-conducting lines or air outlets or PSU components. In the case of a luggage compartment constructed as a "movable bin", the flap in which an installation space for components to be installed in the region of the luggage system is integrated is formed by the pivotable lower shell.

By using an installation space integrated in the flap of the luggage compartment for these components, it is possible for the arrangement of the luggage system in an aircraft region, for example a passenger cabin, to be designed more flexibly. For example, the luggage system may be offset further in the direction of a floor of the aircraft region, i.e. it may be positioned more closely above passenger seats provided in the aircraft region, if components which are normally mounted in the region of an underside of the luggage system, for example PSU components, can now be installed in the installation space integrated in the flap of the luggage compartment. The luggage system therefore enables the space available in an aircraft to be used particularly efficiently.

The second flap element may have, for example, a convex or concave curvature as seen from a position facing the luggage system with a viewing direction towards an outer side, facing away from the installation space, of the second flap element. The first flap element may, on the other hand, be designed in the form of a linear plate or in some other manner in order to define the installation space between the first and the second flap element. In particular, the first flap element may comprise a first portion which extends substantially parallel to the upper side of the luggage compartment base body when the flap is located in its closed position. The first portion may be connected to a second portion which extends, for example, at an angle of 90 to 150°, preferably at an angle of 100 to 140° and particularly preferably at an angle of 115 to 125° relative to the first portion in the direction of the underside of the luggage compartment base body. A standard luggage item, for example a standard trolley suitcase which can be taken into an aircraft cabin as hand luggage, can then be accommodated in the interior space of the luggage compartment base body. It is at the same time possible to realize a sufficiently large installation space integrated in the flap of the luggage compartment.

The first and the second flap element may be pivotable together about a pivot axis in order to move the flap between its closed position and its open position. For example, the first and the second flap element may be pivotable together relative to the upper side, the underside, the side faces and the rear side of the luggage compartment base body about a pivot axis which extends along an edge, facing the flap, of the upper side of the luggage compartment.

The second flap element may be furthermore pivotable relative to the first flap element about a pivot axis in order to open or close the installation space provided between the first and the second flap element. The pivot axis about which the second flap element is pivotable relative to the first flap element may extend along an edge, facing the flap, of the upper side of the luggage compartment. When the luggage system is installed in an aircraft, the installation space provided between the first and the second flap element then is accessible from "below" the luggage compartment, that is to say, a person standing below the luggage compartment may grab into to the installation space provided between the first and the second flap element, for example for maintenance purposes. Furthermore, components installed in the installation space, for example oxygen masks of an emergency oxygen system, then can gravity-driven fall out of the installation space as soon as the second flap element is positioned relative to the first flap element in such a manner that the installation space provided between the first and the second flap element is opened, that is to say, accessible. Only one pivot axis is preferably provided, about which the first and the second flap element are optionally pivotable together or the second flap element is pivotable relative to the first flap element.

In a preferred embodiment, the luggage compartment comprises a locking mechanism which, in a first operating state, connects the first and the second flap element to one another in such a way that the first and the second flap element are movable together in order to move the flap between its closed position and its open position. In a second operating state, on the other hand, the locking mechanism may bring about a release of the connection between the first and the second flap element so that the second flap element is movable relative to the first flap element in order to open or close the installation space provided between the first and the second flap element. If the locking mechanism is in its first operating state, the luggage compartment can then be used as a conventional luggage compartment. It is merely furthermore required that the locking mechanism be transferred into its second operating state in order to access the installation space and therefore the components installed in the installation space.

The second flap element is preferably designed in such a way that the second flap element moves into an open position as a result of gravity when the locking mechanism in its second operating state brings about a release of the connection between the first and the second flap element. The installation space or components installed in the installation space is/are then particularly comfortably accessible. In order to bring about a gravity-induced opening of the second flap element, the shape, weight and the center of mass as well as the connecting point between the first and the second flap element have to be selected accordingly. Furthermore, when designing the second flap element, it is necessary to take into account any components which may be fastened to the second flap element. If desired or required, it is also possible to provide a spring element which pretensions the second flap element in its open position. The second flap element is then forced into its open position by the spring element when the locking mechanism in its second operating state brings about a release of the connection between the first and the second flap element.

The luggage compartment may furthermore comprise a release mechanism which is configured to transfer the locking mechanism from its first operating state into its second operating state. The release mechanism may be a manually actuable or automatically operating mechanism. For example, the release mechanism of a luggage compartment which is integrated in an aircraft cabin may be manually actuable by a central switch in the cockpit or the cabin. The release mechanism preferably reacts to the environmental pressure in the vicinity of the luggage compartment. In particular, the release mechanism may be configured to transfer the locking mechanism from its first operating state into its second operating state when a pressure in the vicinity of the luggage compartment drops below a predetermined threshold value. The predetermined threshold value may be for example a pressure from which persons in an aircraft cabin need to be supplied with additional oxygen.

Such a design of the release mechanism is then particularly advantageous if components of an emergency oxygen system are installed in the installation space of the luggage compartment. These components may include for example oxygen cylinders and oxygen masks connected to the oxygen cylinders.

In the region of an interior surface facing the installation space, the at least one of the first and the second flap element may comprise at least one holder for a component to be installed in the installation space. This simplifies the mounting of the component in the installation space. The shape of the holder is preferably adapted to the shape of the component to be installed in the installation space. For example, a holder which enables an oxygen cylinder of an emergency oxygen system to be fixed in position may be attached to the first and/or the second flap element. A holder of this type is preferably attached to the interior surface, facing the installation space, of the second flap element, as close as possible to the pivot axis about which the second flap element is pivotable relative to the first flap element. The second flap element then can move into its open position as a result of gravity without the oxygen cylinder being exposed to too forceful a movement.

A holder for a component to be installed in the installation space preferably comprises a first holding element connected to the first flap element and a second holding element connected to the second flap element. The first and the second holding element may cooperate with one another in such a way that the component is held in its position in the installation space so long as the first and the second flap element are connected to one another in such a way that the first and the second flap element are movable together in order to move the flap between its closed position and its open position. In other words, the component is held in its position in the installation space as a result of the cooperation between the first holding element and the second holding element so long as the locking mechanism is in its first operating state and connects the two flap elements to one another in such a way that a relative movement between the first and the second flap element is impossible.

If, on the other hand, the connection between the first and the second flap element is released so that the second flap element is movable relative to the first flap element, the design of the first and the second holding element ensures that the component drops out of its position in the installation space as a result of gravity and out of the installation space. This can be brought about for example in that the first holding element provided on the first flap element no longer pushes the component into the second holding element when the second flap element is movable relative to the first flap element.

A holder which is designed in this way with a first and a second holding element is particularly suitable for securing an oxygen mask of an emergency oxygen system in the installation space so long as the first and the second flap element are connected to one another, since it is then ensured that gravity impels the oxygen mask to drop out of its position in the installation space as soon as the second flap element is movable relative to the first flap element. The oxygen mask is then easily reachable for passengers seated on passenger seats below the luggage system. If desired or required, it is also possible to provide a spring element which forces the oxygen mask out of its position in the installation space. The oxygen mask is then pushed out of the installation space by the spring element when the locking mechanism in its second operating state brings about a release of the connection between the first and the second flap element.

The flap of the luggage compartment may be provided with a grip rail which, when the luggage system is mounted in an aircraft, extends parallel to a longitudinal axis of the aircraft. The grip rail may be fastened to the flap or integrated in the flap. The grip rail may particularly be arranged in a portion, not adjoining the installation space, of an exterior surface of the first flap element which faces away from the interior space of the base body.

Finally, the luggage system preferably comprises at least one additional luggage compartment which may be arranged adjacent to at least one of the upper side and the underside of the luggage compartment base body and may comprise a base body and a flap which is movable between a closed position and an open position. If desired, the additional luggage compartment may be fastened to the luggage compartment base body in the region of the upper side or the underside of the luggage compartment base body. However, an underside of the base body of the additional luggage compartment may also be formed integral with the upper side of the luggage compartment base body. Side faces of the additional luggage compartment base body may furthermore be formed integral with the side faces of the luggage compartment base body. The aircraft luggage system can then be realized such that it is lightweight, with only a few individual components, and at the same time stable. The aircraft luggage system can moreover be mounted in particularly simple and time-saving manner since the additional luggage compartment does not need to be mounted separately.

The luggage system offers more stowage space than a conventional luggage compartment as a result of the additional luggage compartment. This facilitates the stowage of hand luggage items in the luggage system to enable shorter boarding and disembarking cycles for an aircraft fitted with the luggage system. For example, a first additional luggage compartment, which serves to accommodate small items, may be arranged adjacent to the underside of the luggage compartment base body. Additionally or alternatively to this, a second additional luggage compartment, which likewise serves to accommodate small items, may be arranged adjacent to the upper side of the luggage compartment base body. The additional luggage compartment may then be used for example to house items of clothing, which prevents the items of clothing from becoming squashed or even damaged by luggage items, for example trolley suitcases, stowed in the luggage compartment. However, as an alternative to this, it is also conceivable to fit the aircraft luggage system with an additional luggage compartment which has the same stowage space as the luggage compartment or even offers a larger stowage space than the luggage compartment. The additional luggage compartment is preferably constructed as a "fixed bin" with only a few moving parts, i.e. it is provided with a base body whereof the underside is rigidly connected to side walls of the base body.

The flap of the additional luggage compartment, which is movable between a closed position and an open position, preferably has a shape which is adapted to the shape of the flap of the luggage compartment. For example, the flaps of the luggage compartment and the additional luggage compartment, as seen from a position facing the luggage system with a viewing direction towards the flaps of the luggage compartment and the additional luggage compartment, may have a continuous, preferably convex or concave, curvature. The dimensions of the luggage compartment and the additional luggage compartment may be selected so that a desired number of standard luggage items can be accommodated in a desired orientation in the luggage compartment and the additional luggage compartment. For example, the dimensions of the luggage compartment and the additional luggage compartment may be selected so that one or two standard trolley suitcases which are permitted on board an aircraft as hand luggage items can be placed upright, flat, lengthwise or transversely in the luggage compartment.

An aircraft region is equipped with a luggage system such as described above.

The aircraft region may furthermore comprise a first rib which forms a component of an aircraft primary structure and extends in a curve along an outer contour of the aircraft region. A second rib, which likewise forms a component of the aircraft primary structure and extends in a curve along the outer contour of the aircraft region, may be arranged at a distance from the first rib, parallel to the first rib. The term "primary structure" refers here to the supporting main structure of an aircraft which defines the fuselage contour of the aircraft and comprises, as essential elements, a plurality of substantially mutually parallel-arranged ribs and a plurality of stringers extending between the ribs, substantially parallel to a longitudinal axis of the aircraft.

The luggage compartment may be arranged between the first and the second rib in such a way that a portion of the first side face, facing the first rib, of the luggage compartment is preferably arranged parallel opposite a side face, facing the luggage compartment, of the first rib and/or a portion of a second side face, facing the second rib, of the luggage compartment is preferably arranged parallel opposite a side face, facing the luggage compartment, of the second rib. Additionally or alternatively to this, the additional luggage compartment may be arranged between the first and the second rib in such a way that a portion of a first side face, facing the first rib, of the additional luggage compartment is preferably arranged parallel opposite a side face, facing the additional luggage compartment, of the first rib and/or a portion of a second side face, facing the second rib, of the additional luggage compartment is preferably arranged parallel opposite a side face, facing the additional luggage compartment, of the second rib. The luggage compartment is therefore positioned in the aircraft region such that it is no longer arranged at a distance from an interior surface, facing the interior space of the aircraft region, of the rib but instead projects into the shadow of the ribs. In similar manner, the additional luggage compartment may also project into the shadow of the ribs.

By positioning the luggage system in such a way that the luggage compartment and/or the additional luggage compartment project(s) into the shadow of the ribs, the installation space present between the ribs can be used as an additional installation space for the luggage compartment and/or the additional luggage compartment. Therefore, by comparison with conventional luggage compartments, the luggage system can optionally have a greater depth in the direction of the outer contour of the aircraft region and can therefore accommodate more luggage or be offset further in the direction of the outer contour of the aircraft region. In the latter case, the luggage system then no longer extends as far as a main aisle extending along the longitudinal access of the aircraft region but is instead comfortably accessible for persons standing to the side of the main aisle between the passenger seating rows. This can avoid persons having to stand in the main aisle of the aircraft region in order to load or unload the luggage compartment. It is thus possible to further shorten the boarding and disembarking cycles for an aircraft fitted with the aircraft region.

However, it is likewise conceivable to arrange the aircraft luggage system in conventional manner such that a rear side of the luggage compartment and/or the additional luggage compartment, as seen in the direction of the outer contour of the aircraft region, is/are arranged in front of the ribs of the aircraft primary structure, i.e. the luggage compartment and/or the additional luggage compartment does not/do not project into the shadow of the ribs.

A portion of the first side face, facing the first rib, of the luggage compartment may project in the direction of the outer contour of the aircraft region beyond the side face, facing the luggage compartment, of the first rib. In similar manner, a portion of the second side face, facing the second rib, of the luggage compartment may project in the direction of the outer contour of the aircraft region beyond the side face, facing the luggage compartment, of the second rib. Additionally or alternatively to this, a portion of the first side face, facing the first rib, of the additional luggage compartment may project in the direction of the outer contour of the aircraft region beyond the side face, facing the additional luggage compartment, of the first rib. In similar manner, a portion of the second side face, facing the second rib, of the additional luggage compartment may project in the direction of the outer contour of the aircraft region beyond the side face, facing the additional luggage compartment, of the second rib. The aircraft luggage system can then be installed in particularly space-saving manner between the ribs and is moreover particularly well suited to accommodating rectangular standard luggage items, such as standard trolley suitcases, which are permitted on board an aircraft as hand luggage items.

In a preferred embodiment of the aircraft region, the luggage compartment is positioned such that the underside of the luggage compartment base body is inclined at an angle of 4 to 15°, preferably at an angle of 4 to 10°, particularly preferably at an angle of 6 to 8°, and in particular preferably at an angle of ca. (at least approximately as used throughout herein) 7° relative to a floor of the aircraft region in the direction of the outer contour of the aircraft region. The upper side of the luggage compartment may be aligned such that it is parallel to the underside, i.e. likewise inclined relative to a floor of the aircraft region in the direction of the outer contour of the aircraft region, or it may be orientated parallel to the floor of the aircraft region. Additionally or alternatively to this, the additional luggage compartment may also be positioned such that the underside of the additional luggage compartment base body is inclined at an angle of 4 to 15°, preferably at an angle of 4 to 10°, particularly preferably at an angle of 6 to 8°, and in particular preferably at an angle of 7° relative to the floor of the aircraft region in the direction of the outer contour of the aircraft region. The upper side of the additional luggage compartment may be aligned such that it is parallel to the underside, i.e. likewise inclined relative to the floor of the aircraft region in the direction of the outer contour of the aircraft region, or it may be oriented parallel to the floor of the aircraft region. At least the underside of the luggage compartment or the additional luggage compartment, which extends immediately over seating rows arranged in the aircraft region, i.e. which forms the underside, facing the seating rows, of the aircraft luggage system, is expediently inclined relative to the floor of the aircraft region as described above.

As a result of the angled arrangement at least of the underside, facing the seating rows, of the luggage system, there is more headroom for passengers seated in the passenger seats arranged below the luggage system. If the luggage compartment and/or the additional luggage compartment is/are mounted at an overall angle relative to the floor of the aircraft region, the luggage compartment and/or the additional luggage compartment can be moved closer to the outer contour of the aircraft region without forfeiting stowage space, i.e. the upper side of the luggage compartment and/or the additional luggage compartment can be moved further towards the outer contour of the aircraft region, thereby creating a more generous spatial impression, particularly in the ceiling area. Moreover, by inclining the luggage compartment and/or the additional luggage compartment relative to the floor of the aircraft region in the direction of the outer contour of the aircraft region, it is possible to prevent luggage items stowed in the luggage compartment and/or the additional luggage compartment from falling out when the luggage compartment and/or the additional luggage compartment is opened.

BRIEF DESCRIPTION OF THE DRAWINGS

Preferred embodiments of the disclosure herein are now explained in more detail with reference to the accompanying schematic drawings, which show:

FIG. 4 is a detailed illustration of a flap of the luggage system integrated in the aircraft region according to FIG. 1 in a closed position;

FIG. 5 is a detailed illustration of the flap according to FIG. 4 in an open position;

FIG. 8 is a detailed illustration of the flap according to FIG. 6, wherein a component installed in an installation space between the first and the second flap element drops out of the installation space as a result of gravity.

DETAILED DESCRIPTION

Figure 1:
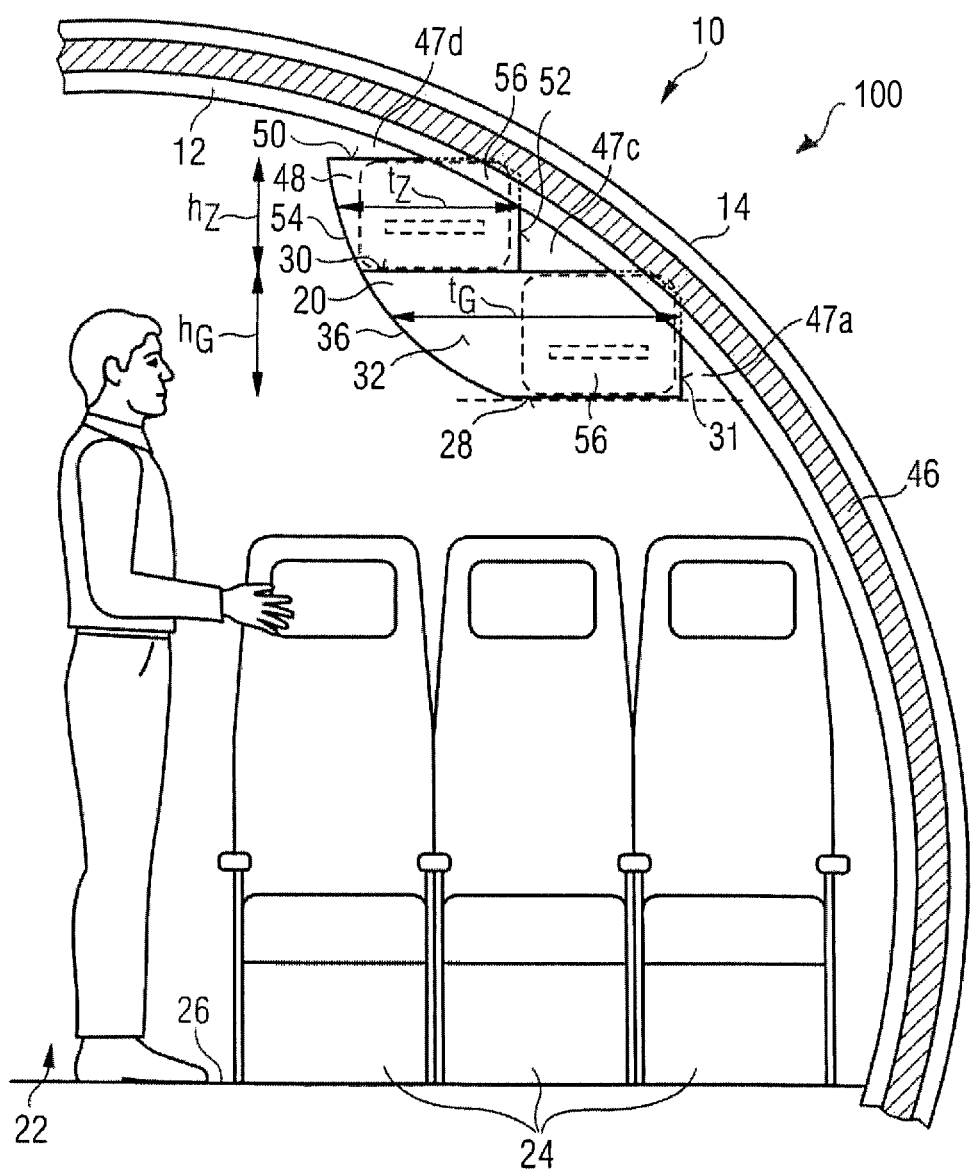
FIG. 1 illustrates an aircraft region, formed by a portion of an aircraft passenger cabin, in a cross-sectional view perpendicular to a floor of the aircraft region, which is equipped with a luggage system.
Figure 2:
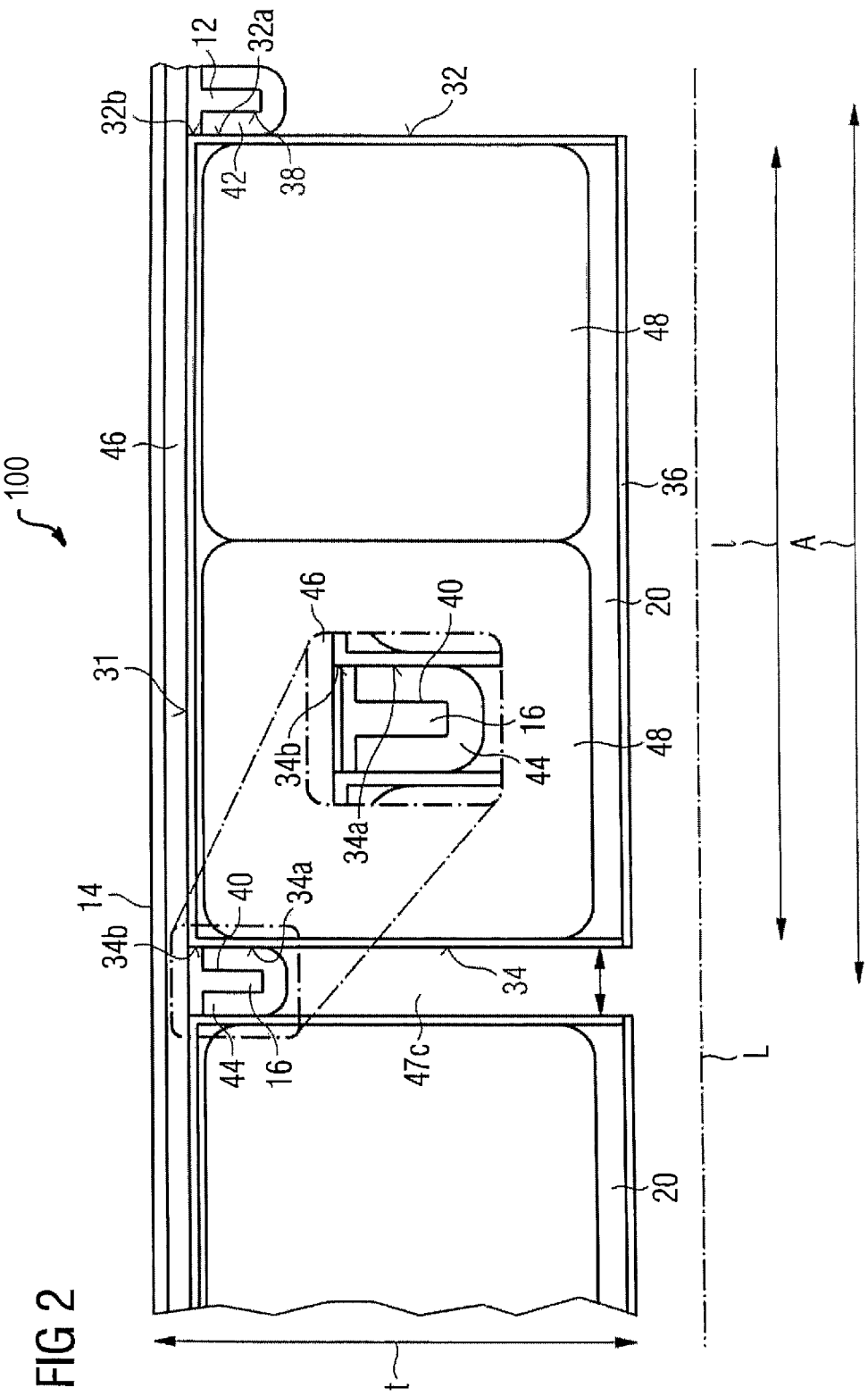
FIG. 2 is a detailed illustration of the aircraft region according to FIG. 1 in a cross-sectional view parallel to the floor of the aircraft region.

A luggage system 10 is installed in an aircraft region 100 shown in FIGS. 1 and 2. The aircraft region 100 comprises a first rib 12, which forms a component of an aircraft primary structure and extends in a curve along an outer contour of the aircraft region 100 which is defined by an outer skin 14 of the aircraft. A second rib 16 is furthermore provided in the aircraft region 100, see FIG. 2. The second rib 16 is arranged at a distance A from the first rib 12 and extends parallel to the first rib 12 in a curve along the outer contour of the aircraft region 100 defined by the outer skin 14. The second rib 16 also forms a component of the primary structure of the aircraft, which comprises further ribs (not shown in the Figures) as well as a plurality of stringers 18 which extend between the ribs 12, 16 parallel to a longitudinal axis L of the aircraft region 100 and therefore also parallel to a longitudinal axis of the aircraft, see FIG. 3.

The aircraft luggage system 10 comprises a luggage compartment 20. The luggage compartment 20 is arranged above passenger seats 24 installed in the aircraft region 100, offset from a main aisle 22 provided in the aircraft region 100 in the direction of the outer contour of the aircraft region 100. The luggage compartment 20 comprises a base body with an underside 28 facing a floor area, i.e. a floor 26 of the aircraft region 100, and an upper side 30 facing a ceiling area of the aircraft region 100. In the exemplary embodiment of an aircraft region 100 which is shown in the Figures, the underside 28 and the upper side 30 of the luggage compartment base body extend substantially parallel to one another. The luggage compartment base body further comprises a rear side 31 which faces the outer contour of the aircraft region 100, i.e. the aircraft outer skin 14. Finally, the luggage compartment base body comprises a first side face 32 facing the first rib 12, and a second side face 34 facing the second rib 16. The underside 28 of the luggage compartment base body is rigidly connected to the side faces 32, 34 and the rear side 31 of the luggage compartment base body.

The luggage compartment 20 is rigidly mounted in the aircraft region 100. For example, the luggage compartment 20 can be connected to the primary structure, in particular the ribs 12, 16, by suitable fastening elements. The luggage compartment 20 furthermore has a flap 36 which is movable between a closed position and an open position. In FIGS. 1 to 4, the flap 36 is shown in its closed position. However, it is pivotable about a pivot axis S, which extends along an edge, facing the flap 36, of the upper side 30 of the luggage compartment 20, in the direction of the ceiling area of the aircraft region 100 relative to the underside 28, the upper side 30 and the side faces 32, 34 of the luggage compartment base body in order to provide access to the luggage compartment 20 for loading luggage items into, and unloading luggage items from, the luggage compartment 20, see FIG. 5. The luggage compartment 20 is therefore a so-called "fixed bin", i.e. a luggage compartment 20 whereof the underside 28 is rigidly connected to the side faces 32, 34 and the rear wall 31 and whereof the interior space is accessible by simply opening the movable flap 36.

As shown most clearly in FIG. 2, the luggage compartment 20 is arranged between the first and the second rib 12, 16 in such a way that a portion 32a of the first side face 32, facing the first rib 12, of the luggage compartment 20 is arranged opposite a side face 38, facing the luggage compartment 20, of the first rib 12. In similar manner, a portion 34a of the second side face 34, facing the second rib 16, of the luggage compartment 20 is arranged opposite a side face 40, facing the luggage compartment 20, of the second rib 16. In particular, the portion 32a of the first side face 32 of the luggage compartment 20, which arranged is opposite the side face 38, facing the luggage compartment 20, of the first rib 12, extends substantially parallel to the side face 38, facing the luggage compartment 20, of the first rib 12. In similar manner, the portion 34a of the second side face 34 of the luggage compartment 20, which is arranged opposite the side face 40, facing the luggage compartment 20, of the second rib 16, extends substantially parallel to the side face 40, facing the luggage compartment 20, of the second rib 16.

The region of the luggage compartment 20 which is delimited by the portions 32a, 34a of the side faces 32, 34 of the luggage compartment 20 in the direction of the longitudinal axis L of the aircraft region 100 therefore is arranged in the shadow of the ribs, which is defined by the two ribs 12, 16. Therefore, by comparison with conventional luggage compartments, the luggage compartment 20 can be arranged in a position which is displaced further in the direction of the outer contour of the aircraft region 100. As a result, the luggage compartment 20 is also accessible to a person who is standing offset from the main aisle 22 in an area between the rows of passenger seats 20. Moreover, the ceiling area of the aircraft region 100 gives the impression of having a generous amount of space which is further emphasized in that the flap 36 of the luggage compartment 20 has a convex curvature as seen from an interior space of the aircraft region with a viewing direction towards the outer contour of the aircraft region 100.

Figure 3:
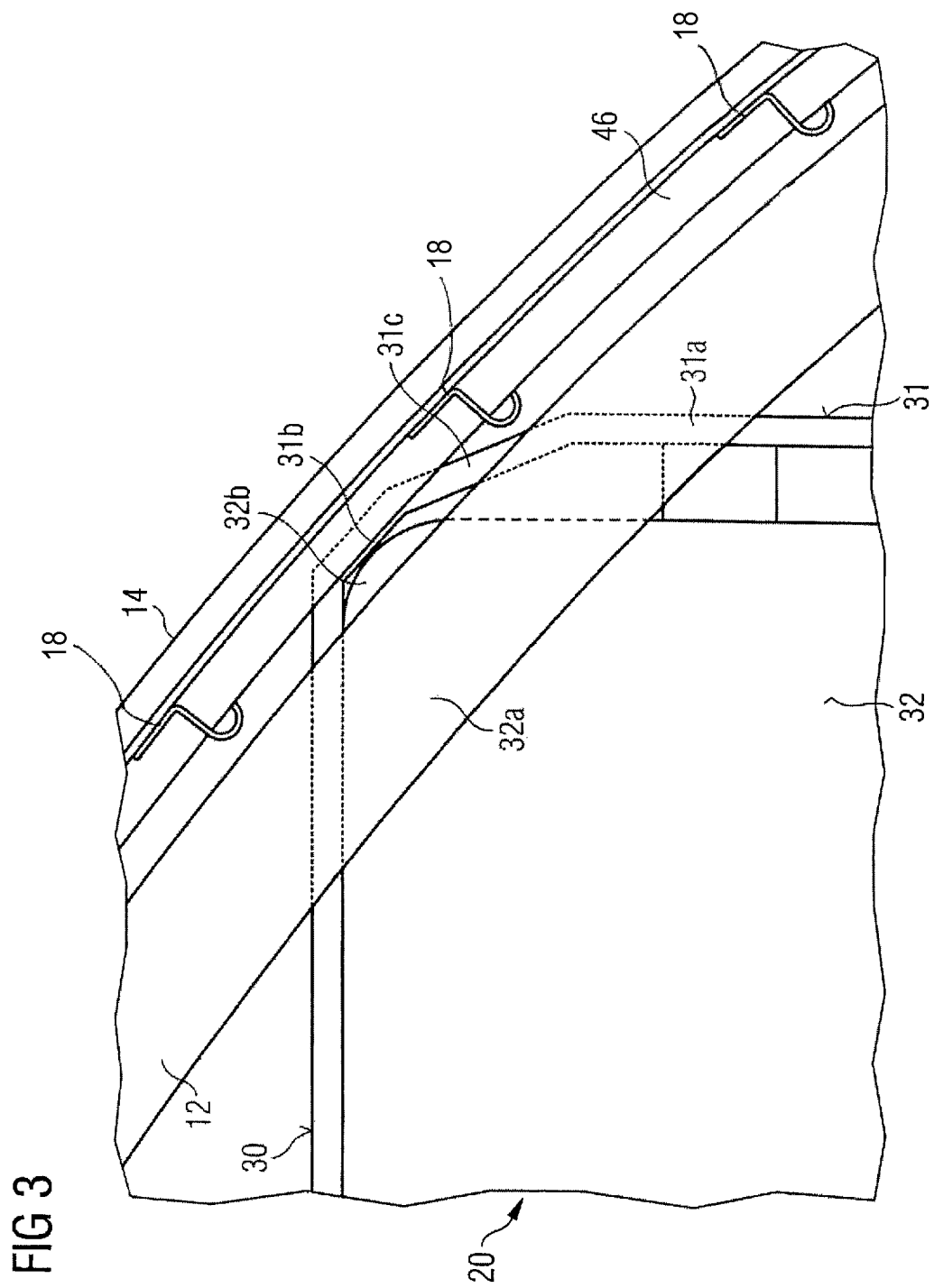
FIG. 3 is a detailed illustration of a rear side of the luggage system integrated in the aircraft region according to FIG. 1.

As shown particularly in FIGS. 2 and 3, the luggage compartment 20 is even positioned so far in the direction of the outer contour of the aircraft region 100 that a portion 32b of the first side face 32, facing the first rib 12, of the luggage compartment 20 projects in the direction of the outer contour of the aircraft region 100 beyond the first side face 38, facing the luggage compartment 20, of the first rib 12. In similar manner, a portion 34b of the second side face 34, facing the second rib 16, of the luggage compartment 20 projects in the direction of the outer contour of the aircraft region 100 beyond the first side face 40, facing the luggage compartment 20, of the second rib 16. The rear side 31 of the luggage compartment 20 has a shape which is adapted to the outer contour of the aircraft region 100. A region of the luggage compartment 20 which is delimited by the portions 32b, 34b of the side faces 32, 34 of the luggage compartment 20 is particularly suitable for accommodating a corner of a cuboidal standard luggage item, for example a standard trolley suitcase permitted in an aircraft cabin as hand luggage.

As can be seen in FIG. 3, the rear side 31 of the luggage compartment 20 has a first portion 31a which extends substantially perpendicularly to the underside 28 and the upper side 30 of the luggage compartment 20. A second portion 31b of the luggage compartment rear side 31 is inclined at an angle of ca. 145° relative to the first portion 31a. The first and the second portion 31a, 31b of the luggage compartment rear side 31 are connected to one another by a transition portion 31c, which is inclined at an angle of ca. 155° relative to the first portion 31a. This design of the luggage compartment rear side 31 enables the luggage compartment 20 to be positioned particularly close to the outer contour of the aircraft region 100.

In order to make optimum use of the installation space available between the ribs 12, 16 for the luggage compartment 20, the portion 32a of the first side face 32 of the luggage compartment 20, which is arranged opposite the side face 28 of the first rib 12, abuts against a first primary insulation element 42 partially sheathing the first rib 12 in the aircraft region 100, as shown in FIGS. 1 to 3. In similar manner, the portion 34a of the second side face 34 of the luggage compartment 20 which is arranged opposite the side face 40 of the second rib 16 abuts against a second primary insulation element 44 partially sheathing the second rib 16. Finally, FIG. 3 particularly shows that the second portion 31b of the rear side 31 of the luggage compartment 20 abuts against a third primary insulation element 46 which extends along the outer contour of the aircraft region 100 in the region of an inner side of the aircraft outer skin 14, which faces the interior space of the aircraft region 100. The third primary insulation element 46 can be fastened for example to the stringers 18 extending between the ribs substantially parallel to the longitudinal axis L of the aircraft region 100.

Contrary to this, the first portion 31a of the luggage compartment rear side 31, the transition portion 31c of the luggage compartment rear side 31 and the luggage compartment upper side 30 are arranged at a distance from the third primary insulation element 46. A region 47a between the first portion 31a and the transition portion 31c of the luggage compartment rear side 31 and the third primary insulation element 46 can then be advantageously used as installation space for components to be mounted in the aircraft region 100, for example electrical or electronic components, components of an aircraft air-conditioning system, such as air-conducting lines, electrical lines or water-conducting lines, see FIG. 1.

Moreover, a region 47b, which is provided between two mutually adjacent luggage compartments 20 in the direction of the longitudinal axis L of the aircraft region 100 and whereof the dimensions in the direction of the longitudinal direction L of the aircraft region 100 are defined by the size of the rib 16 positioned between the luggage compartments 20 and the primary insulation element 44 partially sheathing the rib 16, can be used as installation space for components which are to be integrated in the aircraft region 100.

The luggage system 10 further comprises an additional luggage compartment 48 which is arranged adjacent to the upper side 30 of the luggage compartment base body. The additional luggage compartment 48 comprises a base body which comprises an underside, which is of an integrated construction with the upper side 30 of the luggage compartment base body, and an upper side 50 which extends parallel to the to the underside and faces a ceiling area of the aircraft region 100. The additional luggage compartment base body further comprises a rear side 52 which faces the outer contour of the aircraft region 100 as well as two side faces which connect the upper side 50 and the underside to one another and are each of an integrated construction with the side faces 32, 34 of the luggage compartment base body. The underside of the additional luggage compartment base body is rigidly connected to the side faces and the rear side 52 of the additional luggage compartment base body so that the additional luggage compartment 48 is likewise constructed as a "fixed bin" with only a few moving parts. In terms of its dimensions, the additional luggage compartment 48 is comparable to the luggage compartment 20, i.e., like the luggage compartment 20, the additional luggage compartment 48 is suitable for accommodating standard luggage items 56.

Finally, the additional luggage compartment 48 comprises a flap 54, which is pivotable between a closed position and an open position and, like the flap 36 of the luggage compartment 20, has a convex curvature as seen from an interior space of the aircraft region 100. The shape of the flap 54 of the additional luggage compartment 48 is adapted to the shape of the flap 36 of the luggage compartment so that the flap 54 and the flap 36 have a continuous convex curvature as seen from the interior space of the aircraft region 100. The flap 54 of the additional luggage compartment 48 is shown in its closed position in the figures. However, like the flap 36 of the luggage compartment 20, the flap 54 is pivotable in the direction of the ceiling area of the aircraft region 100 into its open position about a pivot axis which extends along an edge, facing the flap 54, of the upper side 50 of the additional luggage compartment 48.

In terms of its arrangement with respect to the ribs 12, 16, the additional luggage compartment 48 has all the features outlined above in relation to the luggage compartment 20. Therefore, the first additional luggage compartment 48 is arranged between the first and the second rib 12, 16 in such a way that a portion of a first side face, facing the first rib 12, of the first additional luggage compartment 48 is arranged parallel opposite a side face 38, facing the first additional luggage compartment 48, of the first rib 12, and a portion of a second side face, facing the second rib 16, of the first additional luggage compartment 48 is arranged parallel opposite a side face 40, facing the first additional luggage compartment 48, of the second rib 16. Moreover, a portion of the first side face, facing the first rib 12, of the first additional luggage compartment 48 projects in the direction of the outer contour of the aircraft region 100 beyond the side face 38, facing the first additional luggage compartment 48, of the first rib 12. In similar manner, a portion of the second side face, facing the second rib 16, of the first additional luggage compartment 48 projects in the direction of the outer contour of the aircraft region 100 beyond the side face 40, facing the first additional luggage compartment 48, of the second rib 16.

Like the rear side 31 of the luggage compartment 20, the rear side 52 of the first additional luggage compartment 48 has a shape which is adapted to the outer contour of the aircraft region 100. In particular, the rear side 52 of the first additional luggage compartment 48 has a first portion which is adjacent to the underside of the first additional luggage compartment 48 and extends substantially perpendicular to the underside and the upper side 50 of the first additional luggage compartment 48. A second portion of the rear side 52 of the first additional luggage compartment 48 is inclined at an angle of ca. 145° relative to the first portion and is connected to the first portion by a transition portion which is inclined relative to the first portion at an angle of ca. 155°.

The portion of the first side face of the first additional luggage compartment 48, which is arranged opposite the side face 38 of the first rib 12, abuts against the first primary insulation element 42 partially sheathing the first rib 12. In similar manner, the portion of the second side face of the first additional luggage compartment 48, which is arranged opposite the side face 40 of the second rib 16, abuts against the second primary insulation element 44 partially sheathing the second rib 16. Finally, the second portion of the rear side of the first additional luggage compartment 48 abuts against the third primary insulation element 46. Contrary to this, the first portion and the transition portion of the rear side 52 of the first additional luggage compartment 48 and the upper side 50 of the first additional luggage compartment 48 are arranged at a distance from the third primary insulation element 46. Like a region 47d between the upper side 50 of the additional luggage compartment 48 and the outer contour of the aircraft region 100, a region 47c, which is delimited by the upper side 30 of the luggage compartment 20, the rear side 52 of the additional luggage compartment 48 and the outer contour of the aircraft region 100, is therefore available as installation space for components to be mounted in the aircraft region 100.

The essential design parameters of the aircraft region 100 and the luggage system 10 include the distance A between the first and the second rib 12, 16, a maximum dimension I of the luggage compartment 20 and the additional luggage compartment along the longitudinal axis L of the aircraft region 100, a maximum dimension $h_G$ of the luggage compartment 20 between the underside 28 and the upper side 30 of the luggage compartment base body, a maximum dimension $h_z$ of the additional luggage compartment base body 48 between the underside and the upper side 50 of the additional luggage compartment 48, a maximum dimension $t_G$ of the luggage compartment base body between the rear side 31 and the pivotable flap 36 of the luggage compartment 20 and/or a maximum dimension $t_z$ of the additional luggage compartment base body between the rear side 52 and the pivotable flap 36. These design parameters can be varied such that the luggage compartment 20 and the additional luggage compartment 48 can each accommodate a desired number of standard luggage items 56 in a desired orientation, which luggage items can be constructed for example in the form of standard trolley suitcases which are permitted on board an aircraft as hand luggage items. For example, in the luggage system 10 shown in the figures, the frame-element distance A and the dimensions $I_G$, $h_G$, $t_G$, $I_z$, $h_z$, $t_z$ of the luggage compartment 20 and the additional luggage compartment 48 are selected so that in each case a standard luggage item 56 is orientated along the longitudinal axis L of the aircraft region 100 and can be placed flat in the luggage compartment 20 and the additional luggage compartment 48.

As shown in FIGS. 4 to 8, the flap 36 of the luggage compartment 20, which is movable between a closed position and an open position, comprises a first flap element 36a, facing the interior space of the luggage compartment base body, and a second flap element 36b facing away from the interior space of the base body. An installation space 58 for components to be installed in the region of the luggage system 10 is provided between the first and the second flap element 36a, 36b. In the arrangement shown in FIGS. 4 to 8, components of an emergency oxygen system, in particular oxygen cylinders 60 and oxygen masks 62 connected to the oxygen cylinders 60, are installed in the installation space 58 of the luggage compartment 20.

While the second flap element 36b has a convex curvature as seen from the interior space of the aircraft region 100, the first flap element 36a comprises a first portion 36a', which extends substantially parallel to the upper side 30 of the luggage compartment base body when the flap 36 is located in its closed position. The first portion 36a' is connected to a second portion 36a" which extends at an angle of ca. 120° relative to the first portion 36a' in the direction of the underside 28 of the luggage compartment base body. A grip rail 63, which extends parallel to the longitudinal axis L of the aircraft region 100, is arranged in a portion, not adjoining the installation space 58, of an exterior surface of the first flap element 36a which faces away from the interior space of the luggage compartment base body.

As is clear by comparing FIGS. 4 and 5, the first and the second flap element 36a, 36b are pivotable together about the pivot axis S in order to move the flap 36 between its closed position and its open position. The first and the second flap element 36a, 36b here are connected to one another by a locking mechanism 64 (shown only schematically in the Figures) which is then in a first operating state. The locking mechanism 64 can be transferred from its first operating state into a second operating state by a release mechanism 66 (likewise shown only schematically). The release mechanism 66 is designed to transfer the locking mechanism 64 from its first operating state into its second operating state when a pressure in the vicinity of the luggage compartment 20 drops below a predetermined threshold value. The predetermined threshold value is a pressure from which persons in the aircraft region 100 need to be supplied with additional oxygen.

Figure 6:
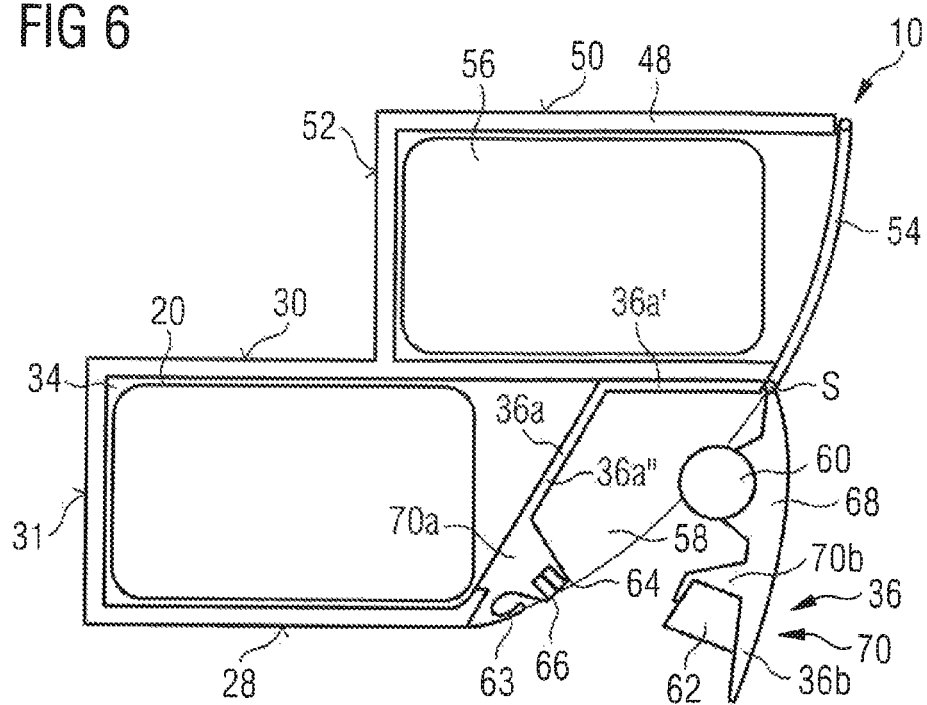
FIG. 6 is a detailed illustration of the flap according to FIG. 4 in an operating state in which a second flap element is movable relative to a first flap element.

In its second operating state, the locking mechanism 64 brings about a release of the connection between the first and the second flap element 36a, 36b so that the second flap element 36b is movable relative to the first flap element 36a in order to open or close the installation space 58 provided between the first and the second flap element 36a, 36b, see FIG. 6. In particular, the second flap element 36b is then pivotable about the same pivot axis S relative to the first flap element 36a so that the first and the second flap element 36a, 36b are pivotable together in the first operating state of the locking mechanism 64.

As is clear from FIG. 6, in terms of its shape, its weight and its centre of mass as well as its connecting point to the first flap element 36a, the second flap element 36b is designed in such a way that the second flap element 36b moves into its open position as a result of gravity when the locking mechanism 64 in its second operating state brings about a release of the connection between the first and the second flap element 36a, 36b. If desired or required, the movement of the second flap element 36b into its open position can be promoted by a suitable spring element (not shown).

Figure 7:
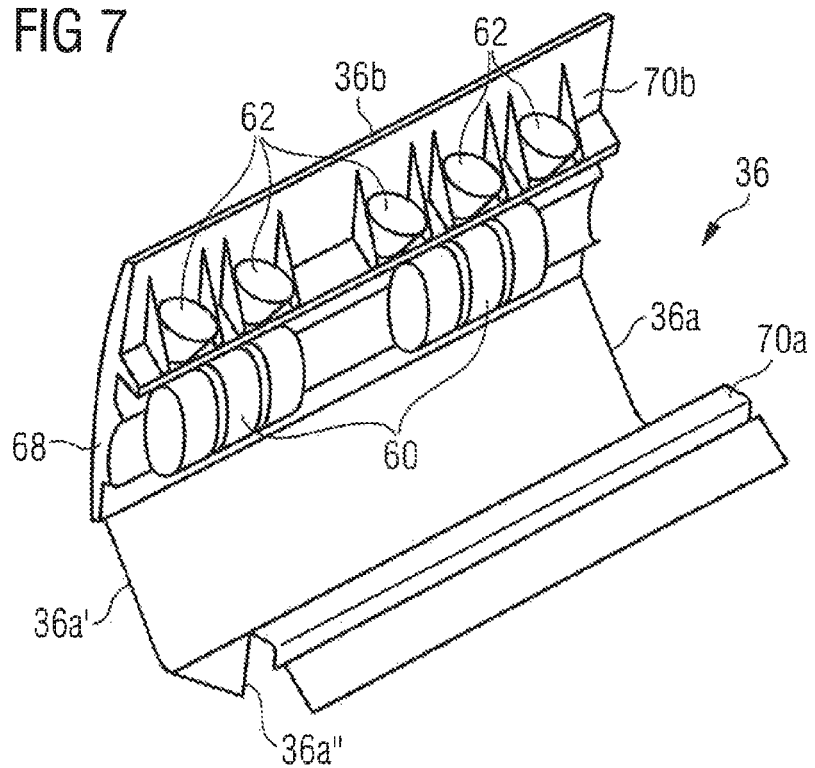
FIG. 7 is a detailed illustration of an installation space provided in the flap according to FIG. 4 in a three-dimensional view.

In the region of an interior surface, facing the installation space 58, the second flap element 36b comprises a holder 68 for the oxygen cylinders 60 of the emergency oxygen system which are to be installed in the installation space 58, see in particular FIG. 7. The holder 68 is attached to the interior surface, facing the installation space 58, of the second flap element 36b so that it arranged as close as possible to the pivot axis S about which the second flap element 36b is pivotable relative to the first flap element 36a in the second operating state of the locking mechanism 64. The second flap element 36b then can move into its open position as a result of gravity without the oxygen cylinder 60 being exposed to too forceful a movement.

A further holder 70 for the oxygen masks 62 of the emergency oxygen system which are to be installed in the installation space 58 comprises a first holding element 70a connected to the first flap element 36a and a second holding element 70b connected to the second flap element 36b. Whilst the first holding element 70a is provided in the region of an interior surface, facing the installation space 58, of the first flap element 36a, the second holding element 70b is arranged in the region of an interior surface, facing the installation space 58, of the second flap element 36b. The first and the second holding element 70a, 70b cooperate with one another in such a way that the oxygen masks 62 are held in their position in the installation space 58 so long as the locking mechanism 64 is in its first operating state and the first and the second flap element 36a, 36b are connected to one another in such a way that the first and the second flap element 36a, 36b are movable together for the purpose of moving the flap 36 between its closed position and its open position.

If, on the other hand, the connection between the first and the second flap element 36a, 36b is released in the second operating state of the locking mechanism 64 so that the second flap element 36b is movable relative to the first flap element 36a, the design of the first and the second holding element 70a, 70b ensures that the oxygen masks 62 drop out of their position in the installation space 58 as a result of gravity and out of the installation space. This is brought about in that the first holding element 70a provided on the first flap element 36a no longer pushes the oxygen masks 62 into the second holding element 70b when the second flap element 36b is movable relative to the first flap element 36a. If desired or required, an additional spring element can also be provided, which forces the oxygen masks 62 out of their position in the installation space 58 when the locking mechanism 64 in its second operating state brings about a release of the connection between the first and the second flap element 36a, 36b.

Although specific embodiments of the disclosure have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise.

Moreover, the terms "first", "second", "third", etc. are used merely as labels, and are not intended to impose numerical requirements on or to establish a certain ranking of importance of their objects.

The invention claimed is:

1. An aircraft luggage system having a luggage compartment, the luggage compartment comprising:
    a base body defining an interior space for receiving luggage, wherein the interior space is closable; and
    a flap,
    wherein the flap is movable between a closed position in which the flap is configured to close the interior space and an open position in which the flap is configured to make accessible the interior space, the flap comprising a first flap element facing the interior space and a second flap element facing away from the interior space,
    wherein an installation space for components which are to be installed in a region of the luggage compartment is provided between the first and the second flap element.

2. The aircraft luggage system according to claim 1, wherein the first and the second flap element are pivotable together about a pivot axis in order to move the flap between its closed position and its open position.

3. The aircraft luggage system according to claim 1, wherein the second flap element is pivotable about a pivot axis relative to the first flap element in order to open or close the installation space provided between the first and the second flap element.

4. The aircraft luggage system according to claim 1, wherein components of an emergency oxygen system are installed in the installation space.

5. The aircraft luggage system according to claim 1, wherein the flap is provided with a grip rail, wherein the grip rail is arranged in a portion, not adjoining the installation space, of an exterior surface of the first flap element which faces away from the interior space.

6. The aircraft luggage system according to claim 1, further comprising an additional luggage compartment which is arranged adjacent to an upper side of the luggage compartment base body and which comprises a base body and a flap which is movable between a closed position and an open position and is designed for making accessible or closed an interior space of the base body of the additional luggage compartment.

7. The aircraft luggage system according to claim 1, further comprising a locking mechanism which, in a first operating state, connects the first and the second flap element to one another in such a way that the first and the second flap element are movable together in order to move the flap between its closed position and its open position, and which, in a second operating state, brings about a release of the connection between the first and the second flap element so that the second flap element is movable relative to the first flap element in order to open or close the installation space provided between the first and the second flap element.

8. The aircraft luggage system according to claim 7, wherein the second flap element is designed in such a way that the second flap element moves into an open position as a result of gravity when the locking mechanism in its second operating state brings about a release of the connection between the first and the second flap element.

9. The aircraft luggage system according to claim 7, further comprising a release mechanism which is configured to transfer the locking mechanism from its first operating state into its second operating state when a pressure in the vicinity of the luggage compartment drops below a predetermined threshold value.

10. The aircraft luggage system according to claim 1, wherein, in a region of an interior surface facing the installation space, at least one of the first and the second flap element comprises at least one holder for a component to be installed in the installation space.

11. The aircraft luggage system according to claim 10, wherein the at least one holder for a component to be installed in the installation space comprises a first holding element connected to the first flap element and a second holding element connected to the second flap element, wherein the first and the second holding element cooperate with one another such that the component is held in its position in the installation space so long as the first and the second flap element are connected to one another in such a way that the first and the second flap element are movable together to move the flap between its closed position and its open position, and in that the component drops out of its position in the installation space as a result of gravity and out of the installation space when the connection between the first and the second flap element is released, so that the second flap element is movable relative to the first flap element.

12. An aircraft region having an aircraft luggage system according to claim 1.

13. The aircraft region according to claim 12, wherein the luggage compartment is positioned such that at least one of an underside and an upper side of the luggage compartment base body is inclined at an angle of 4 to 15°, at an angle of 5 to 10°, at an angle of 6 to 8°, or at an angle of about 7° relative to a floor of the aircraft region in the direction of an outer contour of the aircraft region.

14. The aircraft region according to claim 12, the aircraft region comprising:
 a first rib which forms a component of an aircraft primary structure and extends in a curve along an outer contour of the aircraft region; and
 a second rib which is arranged at a distance from the first rib parallel to the first rib and likewise forms a component of the aircraft primary structure and extends in a curve along the outer contour of the aircraft region;
 wherein the luggage compartment is arranged between the first and the second rib in such a way that a portion of a first side face, facing the first rib, of the luggage compartment is arranged opposite a side face, facing the luggage compartment, of the first rib, and/or that a portion of a second side face, facing the second rib, of the luggage compartment is arranged opposite a side face, facing the luggage compartment, of the second rib.

15. The aircraft region according to claim 14, wherein a portion of the first side face, facing the first rib, of the luggage compartment projects in the direction of the outer contour of the aircraft region beyond the side face, facing the luggage compartment, of the first rib.

16. The aircraft region according to claim 14, wherein a portion of the second side face, facing the second rib, of the luggage compartment projects in the direction of the outer contour of the aircraft region beyond the side face, facing the luggage compartment, of the second rib.

17. The aircraft region according to claim 14, wherein an additional luggage compartment is arranged between the first and the second rib in such a way that a portion of the first side face, facing the first rib, of the additional luggage compartment is arranged opposite the side face, facing the additional luggage compartment of the first rib, and/or that a portion of the second side face, facing the second rib, of the additional luggage compartment is arranged opposite the side face, facing the additional luggage compartment, of the second rib.

18. The aircraft region according to claim 17, wherein a portion of the first side face, facing the first rib, of the additional luggage compartment projects in the direction of the outer contour of the aircraft region beyond the side face, facing the additional luggage compartment, of the first rib.

19. The aircraft region according to claim 17, wherein a portion of the second side face, facing the second rib, of the additional luggage compartment projects in the direction of the outer contour of the aircraft region beyond the side face, facing the additional luggage compartment, of the second rib.

20. The aircraft region according to claim 17, wherein the additional luggage compartment is positioned such that at least one of an underside and an upper side of the additional luggage compartment is inclined at an angle of 4 to 15°, at an angle of 5 to 10°, an angle of 6 to 8°, or at an angle of about 7° relative to a floor of the aircraft region in the direction of an outer contour of the aircraft region.

* * * * *